April 11, 1950   W. S. LINDSEY   2,503,398
LOG SCALE
Filed Sept. 8, 1947
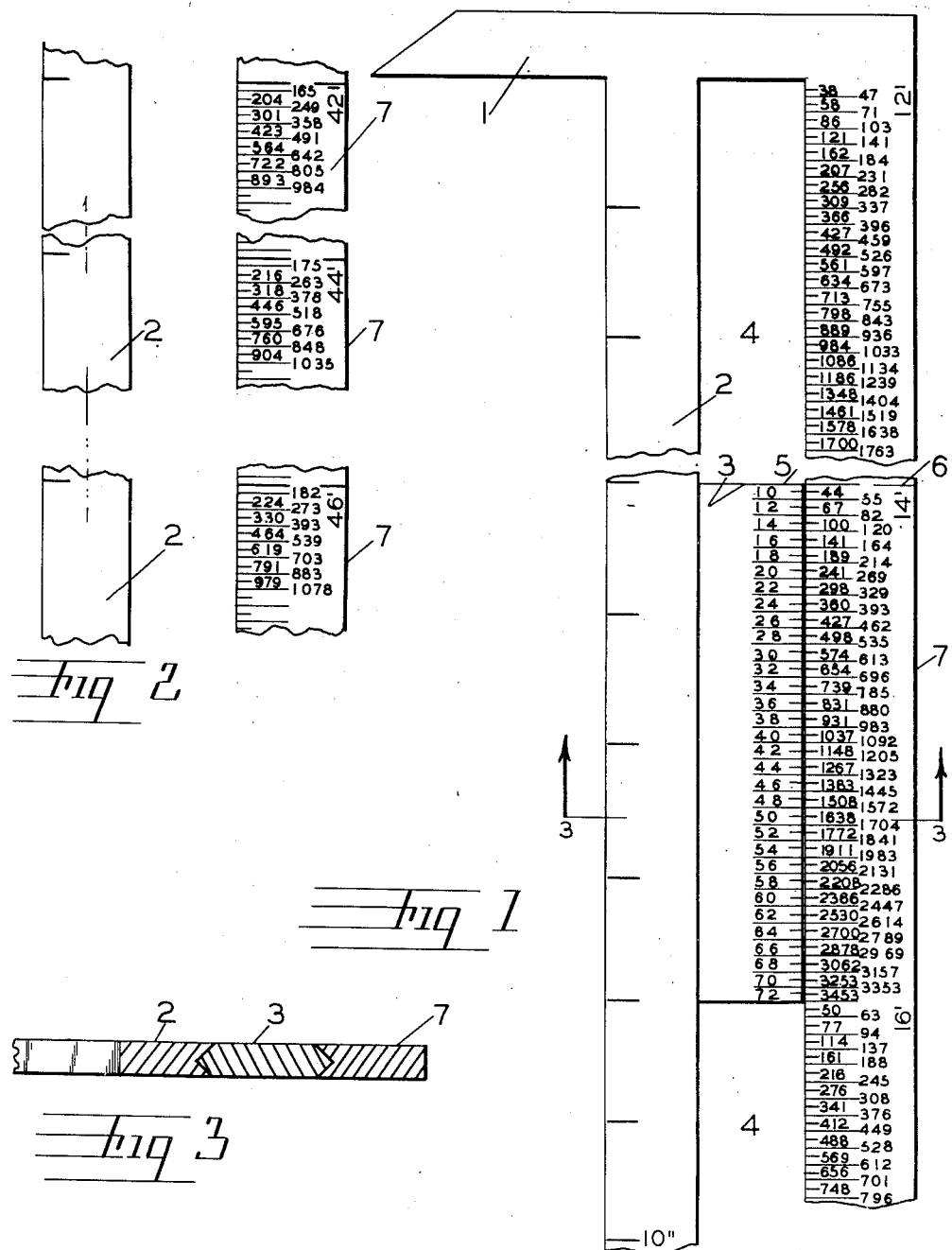
INVENTOR.
WILLIAM S. LINDSEY
BY
G. F. McDougall
ATTORNEY Patented Apr. 11, 1950

2,503,398

UNITED STATES PATENT OFFICE 2,503,398

LOG SCALE

William S. Lindsey, Portland, Oreg.

Application September 8, 1947, Serial No. 772,647

1 Claim. (Cl. 235—70)

This invention relates to indexes for a log scale whereby the scaler can read the contents of a log in board feet immediately on measuring the diameter. It is not a slide-rule or a computer of any sort and merely serves as an epitome of the log scale book that every lumberman is familiar with and uses constantly.

Logs are scaled by the "international rule," formerly "Scribner," adopted so long ago that many scalers have not remembered the name. The board feet contents of a log are, of course, a function of the diameter, affected by the length, but a large log scales proportionately greater than a relatively smaller one because there is less slab loss in the bigger log and the "rule" takes care of that. There is, therefore, no such thing as a slide-rule or logarithmic formula for scaling logs.

The international log rule, based on $\frac{1}{4}$" kerf is $X = 0.904762 \ (0.22 \ D^2 - 0.71D)$, where X is the number of board feet in a 4 foot section of log and D is the diameter at the small end, in inches. In computing the number of board feet in a log, the taper is taken at $\frac{1}{2}$" per 4 ft. linear and separate computation is assumed to be made for each 4 ft. section.

So it will be seen that no logarithmic scale can compute logs. Logs are handled by scale, exclusively. The faller crew is paid by the thousand feet board measure, the "bucker," the truck driver that hauls to mill or railroad, the rail rate is per M board feet, not weight and finally the retail customer buys the lumber by the board feet or per M board feet if he is building. Hence a log will be scaled at least four times before it reaches the saw carriage, by as many different scalers and the ability of each to turn in the same scale total for a given lot of logs as turned in by the others, measures his skill and value at his job. The scaler also is paid by the amount of logs he scales in M board feet.

It is an object, therefore, to provide a tool for the log scaling art that saves much time and promotes accuracy by its use.

The principal purpose and object of the invention is a device for reading the board feet contents of a log, while the scaler still stands on it, hands usually wet, with his tally board in one hand and scale rule in the other.

The "book" is, of course, out of use because the scaler has only two hands. With the invention he doesn't need more. Without it he will spend some time extending his tally sheet after scaling a raft of logs. With the invention his time is saved and the more accurate result, not depending on the symbol, will come closer to what a skilled head sawyer can cut out of the logs. Overrun and underrun are alike indications of unskilled scaling. He has doaty spots, bad knots, winds and crockedness to allow for and these are better taken care of if done at the time.

A drawing illustrates the log scale rule of the invention, in which—

Fig. 1 represents the hook end of the scale rule but only so much of it as will scale a log up to 10" in diameter, the full scale rule will be much longer, perhaps a minimum of 70 inches;

Fig. 2 consists of three transversely separated fragments showing scale rule index means for a log 46 ft. long, the other fragments being a part of the indexes for 44 ft. and 42 ft. logs; and Fig. 3 is a section of the slide, the scale rule and the index rule taken on the plane 3—3, Fig. 1, more fully described hereinafter. Both the slide and the index rule may bear graduations on both sides.

Describing the scale in greater detail: Numeral 1 is the hook used to bear against one side of the log, the scale rule 2 bisects the end of the log and the scaler thumb, not shown, is commonly used as the opposite indicator to ascertain the diameter of the log, where measured. Thus the diameter of the log is read off on the inch scale rule 2 and the length of the log is taped (theoretically) though the skilful scaler seldom finds this necessary unless it is a very long one. Logs are bucked in even numbers of feet length and were for many years read to the nearest even number of inches in diameter, though that is changing to inch diameters.

Having ascertained the length, accurately, it will be assumed that it is a 14 ft. log, hence the cursor 3, is moved in the slot 4, between the parallel scale and index rules until its witness line 5, registers with the witness line 6, of the 14 ft. zone of the index scale. Assuming that the log is 40 inches in diameter, the scale, 1037 board feet, is read directly. If it is 49 inches, the scale is 1572 board feet, and so on.

It will be seen that there is no slide rule work, no factor to consider save the scaler's judgment and the tool is a time saver and accuracy promoter. Later if the log grader, who has a job requiring great experience and skill, wants to grade a log, the same instrument will be invaluable to him as he has, to begin with, the scale that the log would rate if it was a No. 1 log; and he can make his deductions for large knots, doaty spots if any, winds and cracks together with crockedness that materially reduces the amount of lumber the log will actually produce when well sawn.

The trucker or railroad is not concerned with the grade scale; hence never uses it, for reasons at once apparent.

Having fully disclosed my invention, what I claim as new and desire to secure by Letters Patent is:

A board foot computing slide rule for unitary construction with a hook-rule type log scale, comprising a pair of parallel bars, a cursor mounted slidably between said bars, said cursor provided with a face upon which is a columnar tabular diameter scale, one of said bars provided with a face that registers with said cursor face, groups of precomputed board foot tables, each for a different length of log, in spaced position on said registering bar, there being a precomputed board foot contents line on said bar aligned with a diameter on said cursor, when the several diameters on the cursor register with the precomputed contents lines on the bar.

WILLIAM S. LINDSEY.

REFERENCES CITED

The following references are of record in the file of this patent:

UNITED STATES PATENTS

| Number | Name | Date |
|---|---|---|
| 67,269 | Coffin | July 30, 1867 |
| 104,368 | Smith | June 14, 1870 |
| 1,287,040 | Junker | Dec. 10, 1918 |
| 1,305,562 | Paulsen | June 3, 1919 |
| 1,613,975 | Bartlett et al. | Jan. 11, 1927 |
| 1,804,813 | Scharf | May 12, 1931 |
| 2,166,030 | Waeltz | July 11, 1939 |

FOREIGN PATENTS

| Number | Country | Date |
|---|---|---|
| 128,253 | Switzerland | Oct. 16, 1928 |